United States Patent [19]

Daniels

[11] 4,204,191
[45] May 20, 1980

[54] LIGHTING SYSTEM FOR BICYCLES

[76] Inventor: Travis J. Daniels, 1838 Dysart Ave., Columbus, Ohio 43219

[21] Appl. No.: 785,343

[22] Filed: Apr. 7, 1977

[51] Int. Cl.² ............................................. B62J 5/00
[52] U.S. Cl. .................................. 340/134; 340/73; 340/74; 340/81 R; 340/84; 340/87; 315/200 A; 331/113 R; 350/167; 362/72; 362/269; 200/61.12
[58] Field of Search .................... 340/134, 74, 84, 87, 340/73, 81 R, 383; 315/77, 200 A, 82; 200/61.12; 362/72, 368, 382, 257, 269, 270; 331/113 R; 350/167

[56] References Cited

U.S. PATENT DOCUMENTS

| 2,034,934 | 3/1936 | Anderson | 362/72 |
| 2,551,954 | 5/1951 | Lehman | 350/167 |
| 3,040,207 | 6/1962 | Grontkowski | 315/77 |
| 3,284,083 | 11/1966 | Levin et al. | 331/113 R |
| 3,535,680 | 10/1970 | Onksen et al. | 340/81 R |
| 3,588,817 | 6/1971 | Gazzo | 340/87 |
| 3,631,359 | 12/1971 | Jones | 340/81 R |
| 3,792,307 | 2/1974 | Baker | 315/77 |
| 3,858,177 | 12/1974 | Kugelmann | 315/77 |
| 4,020,458 | 4/1977 | Windisch | 340/134 |

FOREIGN PATENT DOCUMENTS 512844 2/1955 Italy ........................................ 340/134

Primary Examiner—John W. Caldwell, Sr.
Assistant Examiner—Donnie L. Crosland
Attorney, Agent, or Firm—Millard, Cox & Smith

[57] ABSTRACT

A lighting system for bicycles and the like which incorporates forwardly and rearwardly mounted lighting assemblies. Each of these assemblies includes right and left turn indicator lamps mounted within housings each having an outwardly directed lenticulated lens, the discrete facets of which protrude in a direction outwardly from an associated lamp. These lenses are utilized in conjunction with lower energy level inputs to the lamps in which an oscillatory circuit to optimize the consumption of energy from a bicycle mounted battery power supply. The batteries of this supply as well as impedance and oscillatory logic circuitry in addition to a recharging circuit are mounted in a unitary housing which is readily removable from the frame of the bicycle for purposes of leaving it unattended. Through the use of a harness incorporating a releasable electrical coupling, this more elaborate and expensive component of the bicycle may be retained for safe keeping when the bicycle is stored or parked.

12 Claims, 8 Drawing Figures

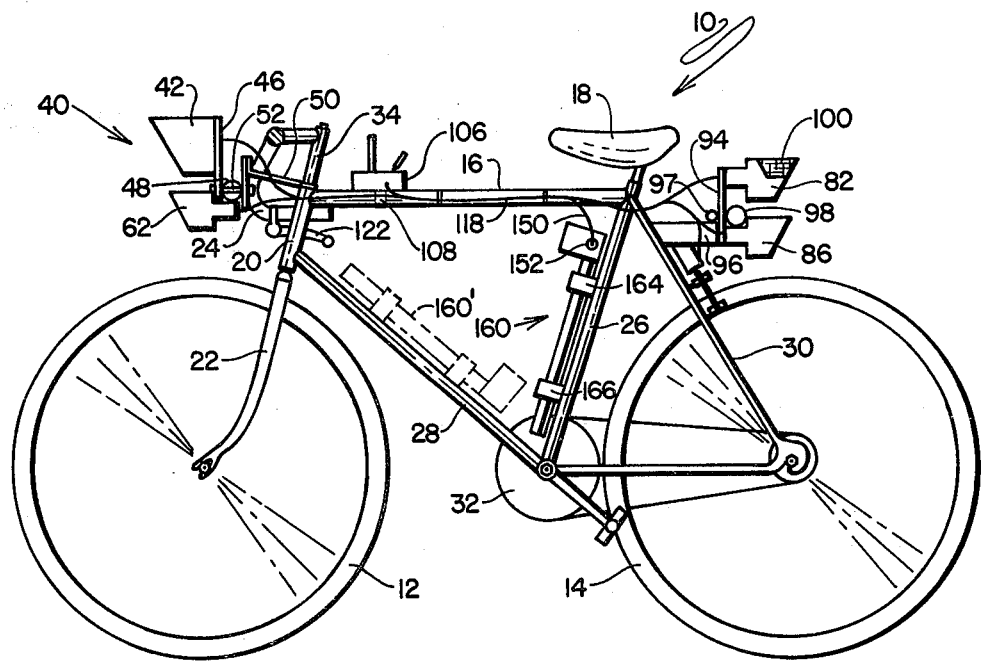
FIG. 1
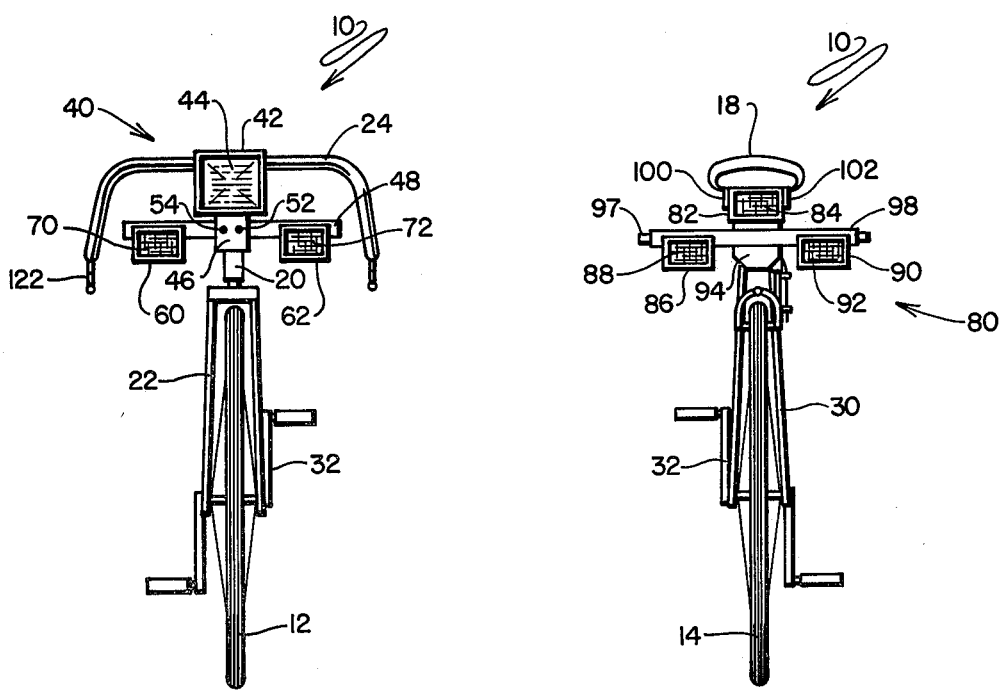
FIG. 2
FIG. 3

LIGHTING SYSTEM FOR BICYCLES

BACKGROUND

Over the recent past, the market has witnessed a profound consumer interest in recreational bicycles. This interest has been described as stemming from a broad variety of reasons, the most often cited one concerning a rapidly growing interest on the part of the public in the health related aspects of the physical exercise available to a bicycle operator. The consequence of this popularity of bicycle riding has been a growing presence of bicycle operators or cyclists, of all ages, on public highways. Further, as the recreation has grown, typical bicycle excursions or trips have lengthened in extent and, concomitantly a great variety of lighter, multi-geared and faster bicycles have entered the marketplace. Increasingly, bicycle trips are made after typical working hours and for extended distances, to the extent that riders now are frequently encountered on the highways at dusk and into nightfall. The highway safety aspects involved with such practices are apparent and the necessity for providing a visually perceptible awareness of the cyclist on the part of motorists has assumed considerable importance.

Heretofore, lighting systems for bicycles have been designed more under ornamental considerations than under criteria meeting the actual operational needs of the cyclist. At the present, the cyclist requires a headlamp which provides adequate forward sight distance while remaining lightweight and rugged, as well as a tail light of the same physical properties and which is readily perceptible by approaching motorists. These features, however, are not in and of themselves fully adequate as safety components. For example, the cyclist often will encounter unavoidable automobile-bicycle highway conditions of particularly higher hazard levels during which period the perceptibility and identification of the bicycle and rider should be significantly enhanced or buttressed. Further, some form of adequately perceptible turn indication should be provided for the cyclist such that no confusion can remain on the part of approaching motorists as to the intention of the cyclist to turn or execute maneuvers lateral to road direction.

The accommodation of all of the above requirements or desiterata normally has required battery power supplies for illumination devices of weight and bulk characteristics not in keeping with the light weight design attributes of modern bicycle structures. Where these power supplies are lessened in capacity to save weight and bulk, the power demands asserted upon them lessen their life spans to the point of impracticality. Bicycle driven generators are used, but must be driven by the operator, thus requiring exertion not particularly appreciated. Further, generators are motion and speed dependent, thus rendering such warning systems inoperative or ineffective during low speed, stopping or other operational conditions which are considered hazardous.

Another consideration necessarily injecting itself concerns the unfortunate prevalence of thievery of valuable accessories from bicycles while they remain locked but unattended. More valuable, sophisticated equipment mounted upon a bicycle cannot be left unattended. The removal of such equipment for short periods wherein the bicycle is locked but unattended represents an operational inconvenience of magnitude rendering the use or purchase of more expensive but quality equipment somewhat impractical.

SUMMARY

The present invention is addressed to a lighting assembly for bicycles or similar recreational vehicles which provides a highly perceptible turn or hazard indication feature while remaining light in weight and operational over practical intervals with conventionally available battery supplies. Through the unique use of lenses, amber type warning lights may be mounted forwardly and rearwardly of the cyclist which, when energized, operate at lower current demands than otherwise are required by conventional bicycle lighting systems. As a consequence, the illuminational warning and turn indicator system for the bicycle is afforded an extended operation life span. To enhance visual perceptibility as well as to further extend the operational life span of the battery power supply, the warning and turn indicator is energized in periodic or oscillatory fashion by a unique, solid state illuminational logic network. The unique lens arrangement used with the warning and turn indicator lighting is one of a lenticulated or multi-facet variety the discrete lenticules of which are arranged to protrude outwardly from a lamp associated with the lighting housing. This arrangement is opposite that normally associated with typical turn indicator lamp structures for automobiles and the like.

Manually actuable switching for use by the cyclist during operation of the bicycle is supported and retained within a housing for that purpose which housing may be mounted at an operationally convenient location upon the vehicle. This switch housing includes a switch for energizing a head lamp at the full energy capacity of the battery power supply to achieve adequate sight distance. However, switching to energize a tail light or rear red warning function is provided at the noted lower energy level and in conjunction with the novel lenticulated lens arrangement of the invention. When energized through a brake actuated switching component, a higher current level is asserted at this rear lighting function to provide a stop light function to apprise oncoming motorists of the braking action being undertaken.

A further salient feature and object of the invention is concerned with the provision of a separate housing for both the battery power supply as well as the illuminational logic system of the invention. Additionally, where rechargeable batteries are incorporated with the system, this same housing retains a recharging circuit for the battery power supply. The battery power supply-illuminational logic circuit housing is removably mounted, for instance upon an upstanding strut of the bicycle frame. Communication with the switch retaining housing as well as the lighting components and the power supply-illuminational logic retaining housing is provided by a wiring harness arrangement which is permanently affixed to the frame of the bicycle. As a consequence, a more expensive component of the lighting system, i.e. the recharging, solid state illumination logic network including oscillator as well as the recharging feature may be readily removed from the bicycle by the operator at the completion of the trip. Through the use of a conventional releasable coupling between the wiring harness and the logic and power supply housing, removal from the electrical harness is readily carried out. Such an arrangement serves the ideal purpose of avoiding the occasion of thievery as well as for protecting batteries from deleterious low temperature conditions and other undesirable environmental affects.

As another feature and object, the switching and illuminational logic arrangement of the system of the invention incorporates a feature wherein all turn indicator lamps may be energized in oscillatory fashion to afford the cyclist an opportunity to greatly enhance the visibility of the bicycle under unusually hazardous conditions. Such a feature considerably improves the highway safety aspects of a bicycle incorporating the system.

A further object and feature of the invention is to provide a lighting system for bicycles as well as improved oscillatory solid state circuit therefore, the system incorporating a forward lighting assembly which may be provided in unitary fashion and which is mounted at a forwardly disposed portion of the bicycle. This forward lighting assembly includes a headlamp retaining housing, a forward right turn indicator lamp retaining housing and a forward left turn indicator lamp retaining housing. Each of the turn indicator housings are configured having an outwardly, forwardly disposed lenticulated lens, the discrete lenticules of which are arranged to protrude outwardly from an associated lamp. Mounted at the rearwardly disposed portion of the bicycle or similar vehicle, a rearward lighting assembly is provided which includes a stop light retaining housing, a rearward right turn indicator lamp retaining housing and a rearward left turn indicator lamp housing. Each of the rearward right and left turn indicator lamp and stop light retaining housings are configured having the above-noted outwardly disposed lenticulated lens structure arranged such that the discrete lenticules are protruding outwardly from the housing. The system includes a battery power supply as well as an illumination logic network and incorporates a manually actuable switch arrangement including a first switch which is actuable to energize the headlamp from the power supply a second switch arrangement which manually actuated to a first position to effect the energization of the forward and rearward lighting assembly right turn indicator lamps and manually actuable to a second position to effect the energization of the forward and rearward lighting assembly left turn indicator lamps. Additionally, a third switch arrangement is provided which is manually actuable to effect the dual energization of both the right and left turn indicator lamps of each of the forward and rearward lighting assemblies the oscillator circuit or network of the assembly serves to intermittently energize the turn signal indicator lamps either all simultaneously for emergency flasher protection or in a left or right designated sense to provide turn indication. This circuit incorporates an impedance arrangement for energizing the indicator lamps at lower levels than otherwise would be available from the battery power supplies.

The system also may incorporate a singular housing wherein the illuminational logic network incorporating an oscillator, the battery power supply and a recharging network for the battery supply may be contained. This housing preferably is made removable and, in this regard, incorporates a releasable electrical coupling to permit its disengagement from the lighting component of the system.

Other objects of the invention will, in part, be obvious and will, in part, appear hereinafter.

The invention accordingly comprises the system and apparatus possessing the construction, combination of elements and parts which are exemplified in the following detailed disclosure. For a fuller understanding of the nature and objects of the invention, reference should be had to the following detailed description taken in conjunction with the accompanying drawings.

BRIEF DESCRIPTION OF THE DRAWINGS

FIG. 1 is a side view of a bicycle incorporating the lighting system of the invention;

FIG. 2 is a front view of a bicycle incorporating the lighting system of the invention;

FIG. 3 is a rear view of a bicycle incorporating the lighting system of the invention;

DETAILED DESCRIPTION

Figure 4:
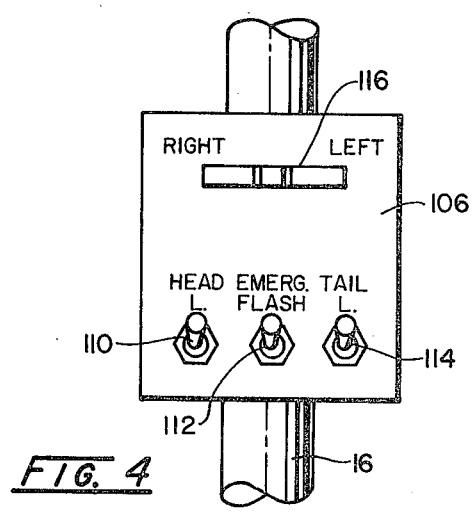
FIG. 4 is a partial top view showing a switch housing of a lighting system according to the invention.

Referring to FIGS. 1-3, a conventional recreational bicycle is represented generally at 10. Bicycle 10 includes forward and rear wheels, respectively shown at 12 and 14, which are supported by a typical frame assembly incorporating a horizontal frame component 16 extending from a seat 18 to a tubular sleeve 20 supporting a steering assembly. The latter assembly includes a conventional fork 22 which extends through sleeve 20 wherefrom it extends along portion 34 to a rigid connection with handlebars 24. Additionally, the frame includes an upstanding strut 26 extending downwardly from seat 18, a forwardly disposed main support 28 and a rear wheel supporting frame 30. Motive power is supplied to the bicycle through a pedal operated crank-sprocket assembly 32.

Disposed at the forward portion of bicycle 10 is a forward lighting assembly 40. Assembly 40 includes a rectangular headlamp retaining housing 42 incorporating a conventional fresnel headlamp lens 44 as well as a conventional six volt headlamp (not shown). Housing 42 is connected to an upstanding support 46 which, in turn, is coupled to a transversely oriented tubular support 48. Support 48, in turn, is connected to the forwardmost component of a forward extending coupling 50. As shown in FIG. 1, coupling 50 is, in turn, connected to the upwardly extending handlebar supporting portion 34 of fork assembly 22. This connection is rigid to the extent that the coupling 50 as well as the entire forward lighting assembly 40 turns in correspondence with turning movement asserted from handlebars 24. Another feature of this coupling arrangement is provided through the connection of two spaced machine bolts or screws 52 and 54 (FIG. 2). These bolts are threadably engaged and extend through support 46 and their end portions abut against the forward surface of coupling 50. As is apparent, by turning the bolts in either a clockwise or counter-clockwise sense, the angle of inclination of headlamp housing 42 may be adjusted. Through appropriate such adjustment, the sight distance of the headlamp function may be adjusted to an optimum value for any given bicycle installation. As is apparent, support 46 should be formed of a resilient material, for example a conventional plastic or suitably resilient metal.

Figure 6:
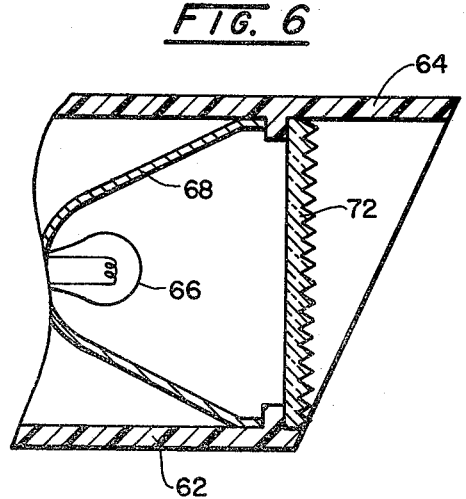
FIG. 6 is a partial sectional view of a turn indicator housing incorporating a lenticulated lens structure according to the invention.

Positioned adjacent headlamp housing 42 are forward right turn indicator lamp housing 60 and forward left turn indicator lamp housing 62. Housings 60 and 62 are configured having a generally rectangular cross-section and include a rearwardly extending portion which is coupled as by bolts to tubular support 48. As is revealed in FIGS. 1 and 6, both housings 60 and 62 as well as headlamp housing 42 are configured having a front or forwardly facing portion which is angularly oriented such that the uppermost surfaces thereof act as hoods to protect the bicycle operator's vision from inadvertent glare characteristics. As represented in FIG. 6, this upward surface for housing 62 is shown as extending forwardly at 64. As revealed in that figure, the turn indicator housings include a lamp 66 which is appropriately connected within a socket (not shown) and extends through a reflector 68. Of particular interest, each of the turn indicator housings includes an outwardly forwardly disposed lenticulated lens, respectively revealed at 70 and 72. Each such lens is formed of a plurality of discrete lenticules sometimes referred to as "corner cubes". Such lenses conventionally are observed in use within automobile turn signal indicators and are formed of a transparent plastic impregnated with a transparent amber pigment. The latter color is selected to provide a light output wavelength for enhanced human visual perceptibility. In the instant embodiment, however, the lenticules of the lens are disposed such that they protrude outwardly from an associated lamp, as at 66. This is the reverse orientation of that commonly encountered. In accordance with the present invention, it has been discovered that by so reversably orienting these lenses, an improved internal reflection is achieved such that the lamps as at 66, representing the light source within the housings, may be selected for operation at voltage ratings and current demands lower than conventionally considered desirable. For example a General Electric type 47 may be used for this function. With such an arrangement, the demands upon the limited battery power supply for bicycle mounted lighting systems are reduced and the practicality of the systems improved. In the instant invention, all lamp housings other than headlamp housing 42 incorporate this particular lens feature, it being apparent that maximum sight distance and light source power is preferred for the headlamp function.

The lighting system of the invention further includes a rearward lighting assembly shown generally at 80 and mounted at a rearwardly disposed portion of bicycle 10, for example behind the seat 18, and extending from the rear wheel supporting frame 30. Assembly 80 incorporates three illuminational components, a stop light retaining housing 82, within which is mounted lenticular lens 84, a rearward left turn indicator lamp retaining housing 86, incorporating lenticulated lens 88, and a rearward right turn housing 90, incorporating lenticulated lens 92. As in forward lighting assembly 40 the lenses at 82, 88 and 92 are positioned within their respective housings in a sense reversed from that normally associated with automotive turn signal indicator lamp convention. A spill bar 97 may be provided to protect the rear assembly 80.

Similar to the mounting of the forward lighting assembly 40, assembly 80 includes an upstanding support 94 which is connected to a U-shaped component 96 of rear wheel supporting frame 30. Such components as at 96 conventionally are incorporated on bicycles as at 10 for purposes of retaining rear reflection devices as well as luggage retainers and the like. Upstanding support 94 also is connected as by bolts or the like to the rearward portion of stop light housing 82. Also connected to support 94 is a horizontal tubular support 98 which serves the same function as support 48 in forward lighting assembly 40. Accordingly, lamp housings 86 and 90 are bolted to support 98 in the manner shown wherein illumination is projected rearwardly. Note additionally, that each side of stop light retaining housing 82 is cut away and covered with a trapezoidal shaped reflector lens which is identical to that at 84 and carries a red pigmentation for a stop light function. As is apparent, during the operation of the lamp within housing 82 at lower or higher intensities, a lateral or side directed indicator output is provided. These side lenses are represented at 100 or 102.

Mounted upon horizontal frame component 16 in the vicinity of handlebars 24 is a box-shaped housing 106. Formed of plastic or suitable material, housing 106 is permanently fixed to component 16 by a ring shaped clasp 108 and serves to support and retain the operational switches of the illumination system, with the exception of the stop light switch. Housing 106 houses only the switching components and retains them in an enclosed, protective environment. As revealed in FIG. 4, the switches which may be incorporated include a headlamp switch 110, an emergency flasher switch 112, a tail light switch 114 and a turn directional indicator switch 116. Housing 106 is positioned in any convenient location upon bicycle 10 which is easily manually accessable on the part of the operator. Forward lighting assembly 40 and rearward lighting assembly 80 are electrically interconnected with the switches at housing 106 by a wiring harness represented at 118. This harness is also permanently attached to the frame of bicycle 10 by conventional harness connectors certain of which are represented at 120. While the major components of a harness may be incorporated inside of the tube components of the bicycle frame, it has been found that the mounting shown does not detract from the ornamental quality of the bicycle.

Figure 5:
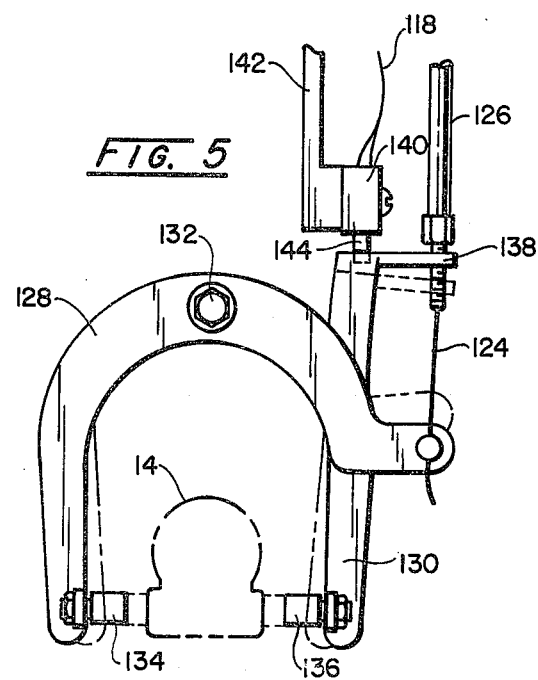
FIG. 5 is a partial view of a hand actuated brake of a bicycle in combination with a switch utilized with the system of the invention.

Looking to FIGS. 1, 3 and 5, the actuator switch arrangement for the stop light function of the illumination system is revealed. The bicycle braking arrangement shown is one of a conventional variety wherein the operator may actuate a rear braking mechanism, for example, by manually grasping and moving a handle portion 122 toward an associated portion of handlebars 24. This motion is transmitted in conventional fashion by a cable 124 slideably retained with a sheath 126. Cable 124, as well as sheath 126 are connected to the actuating component of a conventional calipher brake arrangement including pivotal components 128 and 130. FIG. 5 reveals that these components are pivotally connected at a bolt-type connection 132 attached to rear wheel supporting frame 30. Each of the components 128 and 130 respectively retain rectangularly shaped brake pads 134 and 136. In conventional operation, as cable 124 is withdrawn into sheath 126 a braking action is effected by virtue of the pivotal movement of pads 134 and 136 into engagement with tire 14. This motion causes a bringing together of component 128 and an extension of component 130 shown at 138. As is revealed at FIG. 5, the brake actuator switch is present as a microswitch 140 which is fixedly attached to a bracket 142 in a manner wherein the switch actuator component 144 is retained in a depressed condition as long as the brake is not actuated. Bracket 142 is secured to the earlier described U-shaped frame component 96 described in connection with FIG. 1. Upon actuating the brake system, portions 138 and component 128 are drawn toward each other to release actuator component 144 and provide a switching function.

Figure 7:
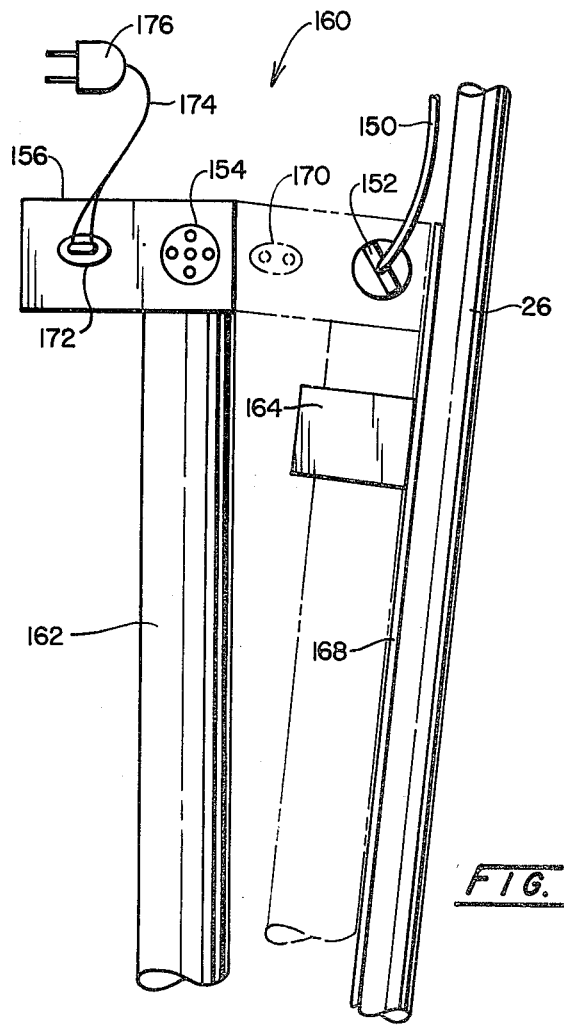
FIG. 7 is a partial side view of a housing of the system of the invention which incorporates a battery power supply, recharging circuit and illuminational logic circuit, the figure showing the unit removed and in position upon an upstanding frame of a bicycle.

Looking to FIGS. 1 and 7, it may be observed that one branch or segment of harness 118 is configured terminating in a female-type electrical plug connector 152. The recessed mating male component of this connector is shown in solid line fashion in FIG. 7 at 154 extending from the upper portion 156 of a housing component, revealed generally at 160, and which additionally includes a tubular portion 162, configured for retaining a multiple battery power supply, the batteries of which are interconnected in series circuit fashion. As revealed in phantom in FIG. 7, housing 160 is removably retained upon bicycle 10 by a resilient clip fastener permanently attached to upstanding strut 26. This fastener includes resilient clip fasteners 164 and 166 which are fixed to an elongate strap or component 168. Strap 168, in turn, is attached to strut 26. Housing 156 serves to retain the illumination logic network of the system as well as an a.c. converter circuit for recharging the battery power supply positioned within tubular portion 162. To provide this recharging function, a female connector 170 is positioned within housing portion 156 and configured to receive a male plug insert 172 which is coupled through electrical cable 174 to an a.c. plug 176 suited for connection with a typical domestic electrical outlet. With the arrangement shown, when bike 10 is left unattended, the operator merely removes plug 152 of the harness assembly from its engagement with receptacle 154 within housing 156. The entire assembly 160 then is carried with the operator. This removal feature also permits the recharging of the device through the connection of plug 172 with a domestic outlet. Of particular importance, the removal feature provides that only the more inexpensive components of the illuminational system remain in fixed relationship upon the bicycle 10 when it is left unattended. For instance it may be recalled that housing 106, as above discussed, retains only switches to the exclusion of all more expensive logic circuitry. As an alternate arrangement, housing 160 may be mounted at component 28 as shown in phantom at 160'.

Figure 8:
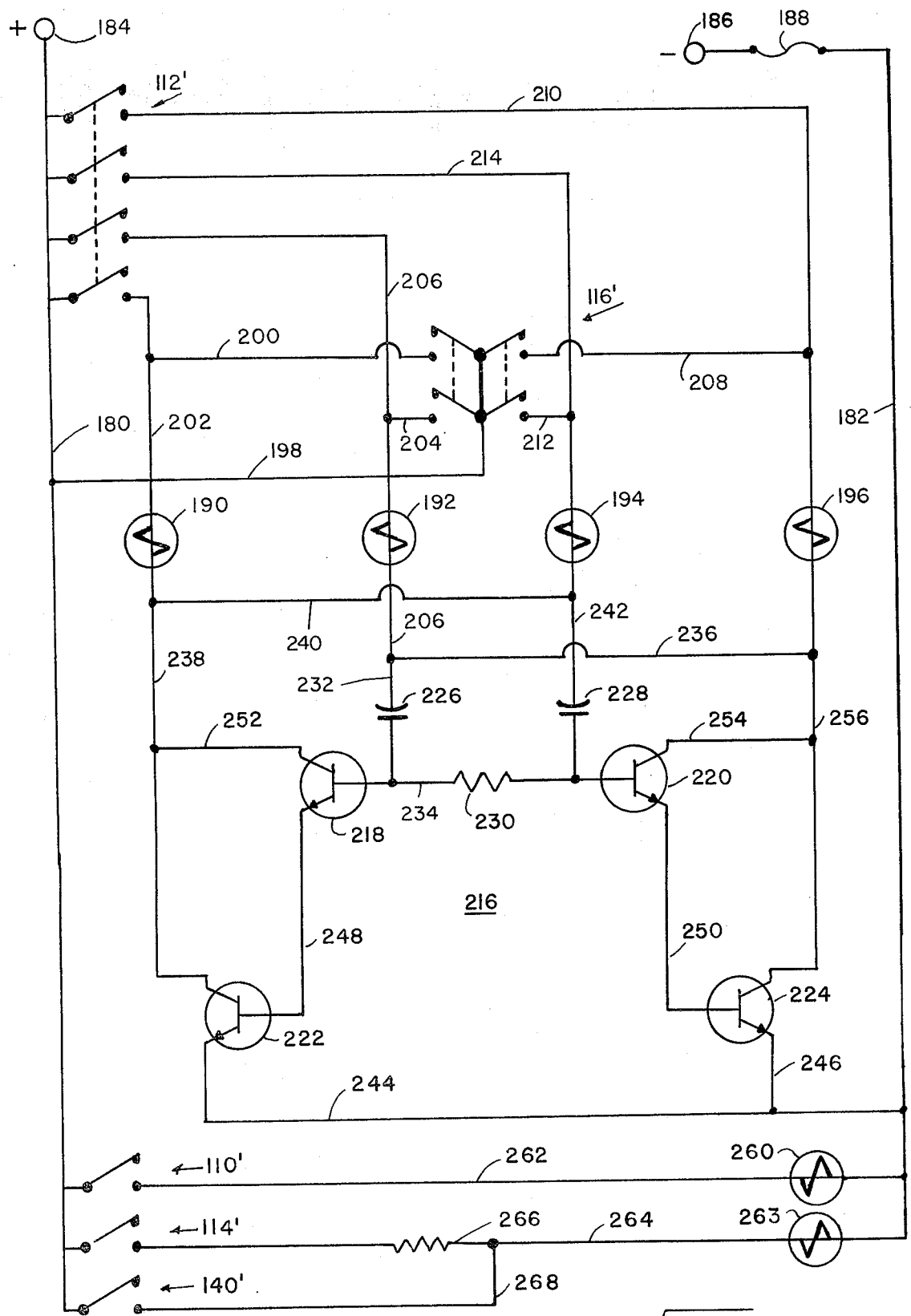
FIG. 8 is a schematic circuit diagram of the illuminational logic circuit of the invention.

Turning now to FIG. 8, the illumination logic circuit is revealed in schematic fashion. The circuit includes two principal power leads 180 and 182 which, respectively, are connected with terminals 184 and 186 intended for connection with opposite designated poles of the battery supply of the system. A fuse 188 is incorporated within power lead 182. A front left turn indicator lamp 190, a rear left turn indicator lamp 192, a rear right turn indicator lamp 194, and a front right turn indicator lamp 196. Turn indicator switch 116 is represented in the figure as a double-pole-double-throw switch 116'. The common input connection of this switch is connected through line 198 to power lead 180. The left turn indicator energization side of the switch is arranged for closure in a manner asserting power simultaneously along lines 200 and 202 to one side of lamp 190 as well as through leads 204 and 206 to a corresponding side of lamp 192. Correspondingly, a closure of switch 116' to provide a right turn signal indication is effected through closure of the switch with line 208 leading to line 210 and through lines 212 and 214. Lines 210 and 214, in turn, are connected to one side of respective turn indicator lamps 194 and 196.

Assuming the operator wishes to indicate a left designated turn maneuver, switch 116' is thrown to assert electrical energy at the noted input side of lamps 190 and 192. This action activates an oscillator circuit designated generally at 216. Circuit 216 serves to effect the alternate energization of lamps 190 and 192 and includes two control transistor stages including NPN transistors 218 and 220. These control transistor stages operate to assert logic control over corresponding drive transistor stages, respectively revealed as NPN transistors 222 and 224. Network 216 further includes timing capacitors 226 and 228 which are associated with an oscillation controlling or tuning resistor 230. In operation, assuming that lamp 192 is illuminated, capacitor 226 is charged through line 206. The capacitor is further connected through line 234 with one side of resistor 230 as well as the base electrode of transistor 218. The output of lamp 192 additionally is coupled through lines 236 and 210 to the collector electrode of drive transistor 224.

In similar fashion, the output of lamp 190 at line 238 is connected through lines 240 and 242 to one side of timing capacitor 228. Capacitor 228, in turn, is connected with line 234 for electrical association with the base electrode of transistor 220 as well as timing resistor 230. The output of lamp 190 additionally is coupled through line 238 to the collector electrode of drive transistor 222. The emitter electrode of transistor 222 is coupled through line 244 to power lead 182, while the corresponding emitter electrode of transistor 224 is connected through line 246 to line 244 and lead 182.

With an initial energization of lamp 192, lamp 192 will be energized by virtue of a completed circuit path including lines 206, 236 and by virtue of the forward biased or "on" status of drive transistor 224. Through the structuring of network 216, when transistor 224 is "on", control transistor 220 necessarily will also be "on" and control transistor 218 will be "off". As lamp 192 continues to be energized, however, timing capacitor 226 will be charged over an interval of time determined by the value of the impedance of the overall network. As the voltage at the electrode of transistor 218 reaches the threshhold level thereof, transistor 218 is turned "on" to, in turn, forward bias the base-emitter junction of drive transistor 222 from line 248. As drive transistor 222 conducts, lamp 190 is energized and timing capacitor 228 is discharged by virtue of its connection through lines 242, 240 and 238 with the collector electrode of drive transistor 222. As transistor 220 is turned "off", drive transistor 224 correspondingly, is turned "off" to de-energize lamp 192. However, by virtue of the connection of energized lamp 190 through lines 240 and 242, capacitor 228 again commences to be charged over the noted time constant of the network to again become forwardly biased to effect a turning "on" of drive transistor 224 by virtue of the connection therebetween at line 250. Note that the collector electrode of transistor 218 is connected through line 252 to line 238, while the corresponding collector electrode of transistor 220 is coupled through line 254 to line 256. Line 256, in turn, is connected both with line 254 and to the collector electrode of drive transistor 224.

Assuming a right turn lamp indication is desired, switch 116' is thrown to assert power through line 198 simultaneously to lines 208 and 212. This in turn asserts power to one side of lamps 194 and 196. Network 216 then performs in corresponding and oscillatory fashion. In this regard, assuming that lamp 196 initially is energized, drive transistor 224 will be "on" to effect such energization and, correspondingly, control capacitor 220 will be "on". As lamp 196 is energized, transistor 226 is gradually charged through line 236 over an interval determined by the impedance of the system until such time as a voltage threshhold level of transistor 218 is reached. At such time, transistor 218 is turned "on" to, in turn, turn "on" transistor 222. As transistor 222 is turned "on" lamp 194 is energized through lines 242, 240 and 238 leading to transistor 222. Correspondingly, transistors 220 and 224 are turned "off" thus effecting the de-energization of lamp 196. This oscillatory system then continues until switch 116' is open.

As noted above, the types of lamps which are utilized for turn indication are those suited for operation at lower powers for instance General Electric type 47 may be utilized, such lamps generally having a 0.15 amp and 15 ohms characteristic. A General Electric type 44 exhibiting a 0.15 amp and 10 ohm characteristic also operates with the system. By using this lower current drain through the lamps in combination with the particular lens configuration described above, a more efficient illumination system is achieved.

Flasher switch 112 is represented in FIG. 8 at 112' and is shown as a four pole-single throw switch. As is apparent, when this switch is thrown, power is simultaneously asserted at one side of each of the lamps 190, 192, 194 and 196. Inasmuch as the output of lamps 192 and 196 are commonly connected respectively through lines 232 and 236, each will be simultaneously energized by oscillatory circuit 216 in the manner above-described. Similarly, the output of lamps 190 and 194 are commonly connected respectively through lines 240 and 242. Accordingly, these two lamps also will be simultaneously energized in correspondence with the simultaneous de-energization of lamps 192 and 196 under the oscillatory control of network 216. As is apparent, network 216 operates in this mode in identical fashion as above described in connection with switch 116'.

Switch 110 is represented in the figure at 110' and serves to energize, through line 262, the lamp 260 located within headlamp housing 42. Note that with the closure of switch 110', all available power from the battery power supply is asserted at lamp 260.

Switch 114, which serves to energize the stop light, is represented in the figure at 114'. When closed, this switch serves to energize stop light lamp 262 through line 264 which, additionally, incorporates a current limiting resistor 266. Accordingly, lamp 262 is energized at a lower power level commensurate with typical tail light performance. On the other hand, when stop light switch 140, represented in FIG. 8 at 140' is actuated, full available battery power is asserted through line 268 to lamp 262. Accordingly, lamp 262 is energized at a higher level than when operating having a tail light function.

It will be apparent that variations may be made in the precise structure of lighting assemblies 40 and 80 without departing of the invention. For example, more efficient constructional or molding techniques are available through the provision of common surfaces and unitary fabrication of the three housings associated with assemblies 40 and 80. Where such an arrangement is provided, similar modification of the mounting brackets and the like is readily provided.

Since certain changes may be made in the above-described system and apparatus without departing from the scope of the invention herein involved, it is intended that all matter contained in the description thereof or shown in the accompanying drawings be interpreted as illustrative and not in a limited sense.

I claim:

1. A lighting system for bicycles having a frame with forwardly and rearwardly disposed portions, including handlebars for guidance, actuable brake means and a seat for providing operator support comprising:

a forward lighting assembly mounted at said forwardly disposed portion and including a headlamp retaining housing, a forward right turn indicator lamp retaining housing and a forward left turn indicator lamp retaining housing, each said forward right and left turn indicator lamp retaining housings being comfigured having an outwardly forwardly disposed lenticulated lens formed of a plurality of discrete lenticules formed as corner cubes which are arranged to protrude outwardly from each said indicator lamp, said assembly being mountable for turning movement with said handlebars;

a rearward lighting assembly mountable in stationary fashion rearwardly of said seat and including a stoplight retaining housing, a rearward right turn indicator lamp retaining housing and a rearward left turn indicator lamp and stoplight retaining housings being configured having an outwardly rearwardly disposed lenticulated lens formed of a plurality of discrete lenticules formed as corner cubes each of which is arranged to protrude outwardly from each said housing;

a battery power supply;

manually actuable switch means including first switch means actuable for energizing said headlamp from said power supply, second switch means manually actuable to a first position to effect the energization of said forward and rearward lighting assembly right turn indicator lamps, and manually actuable to a second position to effect the energization of said forward and rearward lighting assembly left turn indicator lamps, and third switch means manually actuable to effect the dual energization of both said right and left turn indicator lamps of said forward and rearward lighting assembly, said manually actuable switch means being mounted within a switch housing fixedly mountable upon said frame in the vicinity of said handlebars for providing manual access thereto by said operator;

an illumination network including an oscillator circuit responsive to said actuation of said second switch means into said first and second positions and to said actuation of said third switch means to effect said respective right turn indicator lamps, said left turn indicator lamps and said both right and left turn indicator lamps energization in oscillatory fashion from said battery power supply;

housing means for retaining said battery power supply and illumination network, removably mountable upon said frame and including electrical connector means accessible externally of said housing means and electrically connected with said illumination network and said battery power supply; and a wiring harness mounted with said frame and effecting electrical communication between said forward lighting assembly, said rearward lighting assembly, said manually actuable switch means within said switch housing, said batter power supply and said illumination network and including a connector manually removably connectable with said housing means electrical connector means.

2. The lighting system of claim 1 further including: brake switch means;

and said illumination network is configured for energizing said stoplight from said battery power supply substantially at the voltage level available at said battery power supply in response to the actuation of said brake switch means.

3. The lighting system of claim 1 in which each said forward and rearward lighting assembly is configured as a unitary component mountable upon said vehicle.

4. The lighting system of claim 1 in which said housing means includes means for removably retaining rechargeable batteries in series circuit relationship; means for retaining an a.c. converter circuit for selectively recharging said batteries; an externally accessible a.c. input connector for asserting externally derived alternating current into said converter circuit; and means for retaining said illumination logic network.

5. The lighting system of claim 1 in which said housing means is retained upon said frame by a resilient clip fastener.

6. The lighting system of claim 1 in which said illumination network and switches supported upon said switch housing are mutually configured for providing electrical energy to said headlamp at the full available current level of said battery power supply, said lamps within said forward and rearward turn indicator housings being energizable at a current level lower than said full available level.

7. The lighting system of claim 1 in which:

said system includes brake switch means actuable simultaneously with said brake actuation; and wherein said illumination network is configured for energizing said stoplight at the full available voltage level of said battery power supply in response to said brake switch means actuation.

8. The lighting system of claim 1 in which said second switch means is a double pole-double throw switch; and said third switch means is a four pole single-throw switch.

9. The lighting system of claim 1 in which:

said illumination network and said first switch means are mutually configured for providing electrical energy to said headlamp at the full available voltage level of said battery power supply; and said illumination network includes impedance means for effecting the provision of electrical energy to said stoplight at a voltage level lower than said full available level.

10. The lighting system of claim 9 in which:

said system includes brake switch means actuable simultaneously with said brake actuation; and wherein said illumination network is configured for energizing said stoplight at the full available voltage level of said battery power supply in response to said brake switch means actuation.

11. The lighting system of claim 10 in which said housing means is retained upon said frame by a resilient clip fastener.

12. The lighting system of claim 11 in which said housing means includes means for removably retaining rechargeable batteries in series circuit relationship; means for retaining an a.c. converter circuit for selectively recharging said batteries; an externally accessible a.c. input connector for asserting externally derived alternating current into said converter circuit; and means for retaining said illumination logic network.

* * * * *